(12) United States Patent
Stille et al.

(10) Patent No.: US 8,411,580 B2
(45) Date of Patent: Apr. 2, 2013

(54) MAINTAINING CACHED TERMINAL DATA

(75) Inventors: Mats Stille, Bromma (SE); Fredrik Tystad, Saltsjö Boo (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 950 days.

(21) Appl. No.: 11/211,093

(22) Filed: Aug. 25, 2005

(65) Prior Publication Data

US 2006/0089966 A1 Apr. 27, 2006

(30) Foreign Application Priority Data

Oct. 5, 2004 (SE) ........................................ 0402396
Dec. 23, 2004 (WO) .................. PCT/EP2004/053703

(51) Int. Cl.
*G06F 7/00* (2006.01)
(52) U.S. Cl. .......................... 370/252; 370/401; 370/410
(58) Field of Classification Search .................. 379/387, 379/142.13, 142.17, 142.15; 370/252, 401, 370/410

See application file for complete search history.

(56) References Cited

U.S. PATENT DOCUMENTS

| | | | |
|---|---|---|---|
| 5,131,016 A | | 7/1992 | Broughton et al. |
| 5,621,894 A | | 4/1997 | Menezes et al. |
| 6,725,281 B1 | * | 4/2004 | Zintel et al. ................... 719/318 |
| 6,822,957 B1 | * | 11/2004 | Schuster et al. .............. 370/389 |
| 7,031,279 B2 | * | 4/2006 | Lee et al. ...................... 370/331 |
| 7,089,307 B2 | * | 8/2006 | Zintel et al. ................... 709/224 |
| 7,200,139 B1 | * | 4/2007 | Chu et al. ...................... 370/352 |
| 7,525,936 B2 | * | 4/2009 | Buckley et al. ............... 370/328 |
| 7,529,675 B2 | * | 5/2009 | Maes ......................... 704/270.1 |
| 7,680,952 B1 | * | 3/2010 | Pan et al. ...................... 709/239 |
| 7,720,941 B2 | * | 5/2010 | Nelson et al. ................. 709/221 |
| 2003/0065788 A1 | | 4/2003 | Salomaki |
| 2003/0188010 A1 | * | 10/2003 | Raza et al. .................... 709/238 |
| 2003/0210649 A1 | * | 11/2003 | Bondi .......................... 370/229 |
| 2005/0221813 A1 | * | 10/2005 | Rajahalme et al. ......... 455/422.1 |
| 2006/0037022 A1 | * | 2/2006 | Byrd et al. .................... 718/104 |
| 2006/0041431 A1 | * | 2/2006 | Maes ......................... 704/270.1 |
| 2006/0041658 A1 | * | 2/2006 | Nelson et al. ................. 709/224 |
| 2006/0294112 A1 | * | 12/2006 | Mandato et al. ............. 707/100 |
| 2007/0258472 A1 | * | 11/2007 | Eklund ......................... 370/401 |
| 2008/0019304 A1 | * | 1/2008 | Buckley et al. ............... 370/328 |
| 2008/0235317 A1 | * | 9/2008 | Burgmans .................... 709/201 |

FOREIGN PATENT DOCUMENTS

EP 1 248 431 10/2002

OTHER PUBLICATIONS

Report on alternative architectures for combining CS Bearers with IMS, 3GPP TR 23.899 V1.0.0, Dec. 13-16, 2004; pp. 1-52, XP-002320984.

(Continued)

*Primary Examiner* — Jay P Patel
(74) *Attorney, Agent, or Firm* — Nixon & Vanderhye, P.C.

(57) ABSTRACT

A method of maintaining cached Session Initiation Protocol (SIP) terminal capability information at an end user terminal of a telecommunication system, for one or more other end user terminals. The method comprises predefining one or more signalling message properties for signalling messages to be received from peer terminals, and recording the properties at said end user terminal, examining incoming signalling messages received from peer terminals to determine whether or not they possess a predefined property, and if an incoming signalling message does possess a predefined property, reacting by refreshing the cached capability information for the sending terminal.

11 Claims, 3 Drawing Sheets

OTHER PUBLICATIONS

3GPP TS 23.228, V6.10.0 (Jun. 2005); 3$^{rd}$ Generation Partnership Project; Technical Specification Group Services and System Aspects; IP Multimedia Subsystem (IMS); Stage 2 (Release 6).

3GPP TS 24.299 V6.7.0 (Jun. 2005); 3$^{rd}$ Generation Partnership Project; Technical Specification Group Core Network and Terminals; IP Multimedia Call Control Protocol Based on Session Initiation Protocol (SIP) and Session Initiation Protocol (SIP) and Session Description Protocol (SDP); Stage 3 (Release 6).

3GPP TR 23.899 V1.1.0 (Feb. 2005); 3$^{rd}$ Generation Partnership Project; Technical Specification Group Services and System Aspects; Report on Alternative Architectures for Combining CS Bearers with IMS; Release 6.

International Search Report and Written Opinion of the International Searching Authority in International Application No. PCT/EP2004/053703 dated Mar. 23, 2005.

Recommendation ITU-T H.324, Terminal for low bit-rate multimedia communication (Apr. 2009).

EP Examination Report mailed Mar. 14, 2012 in EP application 04805030.6.

\* cited by examiner

MAINTAINING CACHED TERMINAL DATA

This application claims priority from and the benefit of Swedish patent application number 0402396-6 filed on 5 Oct. 2004 and International patent application number PCT/EP2004/053703 filed on 23 Dec. 2004, both of which are incorporated herein by reference.

FIELD OF THE INVENTION

The present invention relates to an apparatus and method for maintaining the capabilities of communication terminals and in particular, though not necessarily, of Session Initiation Protocol terminals.

BACKGROUND

IP Multimedia (IPMM) services provide a dynamic combination of voice, video, messaging, data, etc. within the same session. By growing the numbers of basic applications and the media which it is possible to combine, the number of services offered to the end users will grow, and the interpersonal communication experience will be enriched. This will lead to a new generation of personalised, rich multimedia communication services, including so-called "combinational IP Multimedia" services which are considered in more detail below.

IP Multimedia Subsystem (IMS) is the technology defined by the Third Generation Partnership Project (3GPP) to provide IP Multimedia services over 3G mobile communication networks (3GPP TS 23.228 and TS 24.229 Release 5 and Release 6). IMS allows new rich person-to-person (client-to-client) as well as person-to-content (client-to-server) communications over an IP-based network. The IMS makes use of the Session Initiation Protocol (SIP) to set up and control calls or sessions between user terminals (or user terminals and network servers). The Session Description Protocol (SDP), or other protocol, carried by SIP signalling, is used to describe and negotiate the media components of the session. Other protocols are used for media transmission and control, such as Real-time Transport Protocol and Real-time Transport Control Protocol (RTP/RTCP), Message Session Relay Protocol (MSRP), Hyper Text Transfer Protocol (HTTP). IMS requires an access network which might be for example a 2G/3G General Packet Radio Service (GPRS)/Packet Switched (PS) network, but which might be some other access network such as fixed broadband or WiFi network. FIG. 1 illustrates schematically how the IMS fits into the mobile network architecture in the case of a GPRS/PS access network.

The IMS services which a SIP enabled user terminal can access will depend upon the capabilities of the terminal. For example, a terminal will only be able to make use of a picture sharing service if the terminal has a camera and appropriate photo functionality. SIP, as defined in IETF RFC 3261, provides a so-called SIP OPTIONS mechanism which allows the SIP client of a terminal to determine the capabilities (e.g. supported applications, codecs, etc) of some other terminal. The mechanism requires the sending of a SIP OPTIONS method from a first to a second terminal, and the sending of a response, 200OK, in the reverse direction.

It is noted that SIP is applicable to services other than those facilitated by IMS. It is also noted that terminal capability exchange is a requirement of multimedia setup and control protocols other than SIP. For example, the International Telecommunication Union Telecommunications Sector (ITU-T) has defined the standard H.324 which provides a mechanism for capability exchange.

It is anticipated that in the very near future SIP functionality will be implemented in mobile cellular terminals. In order to allow subscribers to maximise their use of the available IMS services, this SIP functionality will, sooner or later, include the SIP OPTIONS mechanism. However, the sending of a SIP OPTIONS message and a response between terminals is likely to significantly increase the consumed signalling resources.

In order to reduce the SIP signalling requirements, it has been proposed (3GPP TR 23.899 version 0.5.0) to store or "cache" the result of an initial capability query facilitated by SIP OPTIONS, at mobile terminals. The initial capability query may be carried out the first time that a given terminal tries to set up a SIP call to another terminal. For any subsequent call attempts, the calling and called terminals extract information from their respective caches to determine peer capabilities. it is noted that similar proposals have been presented for H.324.

SUMMARY

A problem with the caching approach outlined above is that the cached capability information will become "stale" unless it is refreshed at least occasionally. For example, a subscriber may acquire a new terminal with additional capabilities or take advantage of a software upgrade (or even make use of a terminal with reduced capabilities), or subscribe to new IMS services, and the changes must be conveyed to peer terminals. Unless this is done, there is a danger that signalling resources will be consumed unnecessarily, and that connection attempts will fail even though the peer terminals have the requisite capabilities.

A solution to this problem might be to send periodic refresh requests between terminals, e.g. once per month. However, this has two disadvantages. Firstly, it will not react immediately when a terminal's/subscriber's capabilities are changed, and secondly, when capabilities have not changed since the last refresh, unnecessary signalling will be required.

These problems are applicable to SIP as well as other multimedia setup and control protocols, which utilise a terminal capability exchange procedure.

It is an object of the technology disclosed herein to overcome or at least mitigate these disadvantages. This is achieved by specifying a number of events at which refresh should be performed. These events are indicative of a change in a terminal's/subscriber's capabilities.

According to a first aspect of the technology disclosed herein there is provided a method of maintaining cached capability information at an end user terminal of a telecommunication system, the cached information comprising information for one or more other end user terminals and/or associated subscribers and the cached information being used to control the establishment of communication channels between terminals, the method comprising:

predefining one or more signalling message properties for signalling messages to be received from peer terminals;

examining incoming signalling messages received from peer terminals to determine whether or not they possess a predefined property; and if an incoming signalling message does possess a predefined property, reacting by refreshing the cached information for the sending terminal.

The technology disclosed herein is applicable in particular to a method of refreshing cached terminal and/or subscriber capabilities.

Embodiments of the technology disclosed herein result in a refreshing of the cached terminal capabilities when this is needed or there is a likelihood that it is needed. However, refreshing is carried out with a relatively low frequency.

Said capability information may comprise one or more of: terminal capabilities, subscription capabilities, access network capabilities, and service network capabilities.

Preferably, the method comprises initially populating the cache for each other end user terminal at the first communication between the terminals.

Preferably, said predefined properties comprise a combination of message type and message content. More preferably, this message content is content which is indicative of a change in the capabilities of the terminal and/or subscriber from whom the message is sent.

Said step of refreshing the cached capability information for the sending terminal may comprise updating the cache entry for that terminal with information contained in the received message and/or sending a capability request to the sending terminal and refreshing the cache based upon the contents of the response.

The predefined signalling message properties may comprise one or more of the following:

a connection initiation failure message returned in response to a connection initiation request;

a connection initiation request containing or pertaining to capabilities not currently identified in the cached information; and a message relating to capability negotiation.

Preferably, said predefined properties are recorded at said end user terminal

The technology disclosed herein is applicable in particular to the maintenance of capability information in respect of Session Initiation Protocol terminal capabilities. SIP capability information may be conveyed between terminals using SIP OPTIONS, INVITE, or other suitable SIP message. In this case, initial cached information may be obtained via SIP OPTIONS and the SIP response. A connection initiation request may be sent using SIP INVITE.

The technology disclosed herein is also applicable to other protocols, for example to H.324, and in particular to 3G-324m.

According to a second aspect of the technology disclosed herein there is provided an end user terminal for use with a telecommunications network, the terminal comprising:

a first memory storing cached information comprising information for one or more other end user terminals and/or associated subscribers; and processing means for examining incoming signalling messages received from peer terminals to determine whether or not they possess a predefined property, and if an incoming signalling message does possess a predefined property, for performing a refresh of the cached information for the sending terminal.

Preferably, the terminal comprises a second memory storing one or more predefined signalling message properties for signalling messages to be received from peer terminals.

According to a third aspect of the technology disclosed herein there is provided a method of maintaining cached information at an end user terminal of a telecommunication system, the cached information comprising information for one or more other end user terminals and/or associated subscribers and the cached information being used repeatedly to control the establishment of communication channels between terminals, the method comprising:

predefining one or more signalling message types for signalling messages to be received from peer terminals;

examining incoming signalling messages received from peer terminals to determine whether or not they match one of said predefined types; and if an incoming signalling message does match one of said predefined types, reacting by refreshing the cached information for the sending terminal.

DETAILED DESCRIPTION OF CERTAIN EMBODIMENTS

Figure 1:
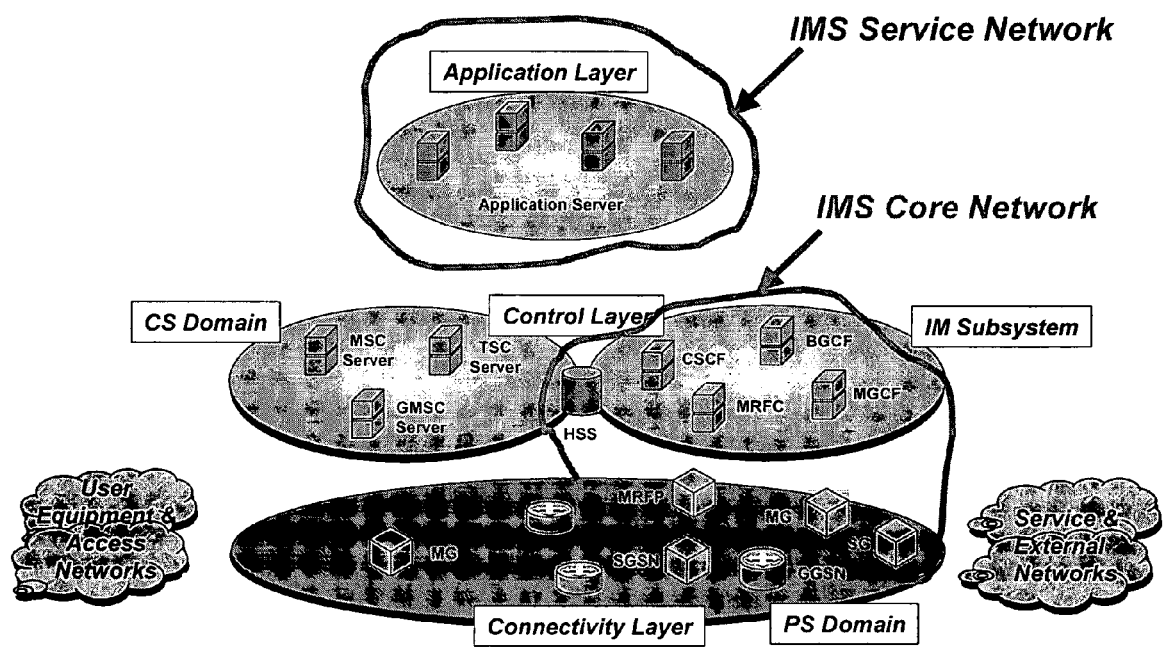
FIG. 1 illustrates schematically the IMS architecture within a 3G network.

For the purpose of illustration, one might consider a subscriber who is in possession of a new 3G (i.e. UMTS) terminal (or alternatively a GSM terminal. Assuming that the terminal comprises a SIP terminal application, the subscriber will have the option of establishing a SIP call to peer SIP enabled terminals. The exact nature of the SIP connections that can be established will depend a) upon the capabilities of both the subscriber's new terminal, and upon the capabilities of peer terminals, and, optionally, b) upon the services for which the subscribers registered, and, optionally, c) upon the capabilities of the access network serving the subscriber terminals.

The subscriber's terminal sets aside an area of random access memory to be used for caching peer terminal capability information. Initially, the area will be empty. Consider the case where the subscriber makes a conventional circuit switched (CS) voice call to a peer subscriber for the first time. Assuming that the CS call request is answered by the peer terminal, a CS call will be established in the usual way. Depending upon the way in which SIP is implemented, the calling terminal may then examine the cache to see if it contains the telephone number of the called party, and will determine that it does not. The called party's telephone number will then be entered into the cache. A capability exchange procedure is then conducted between the two terminals. This involves the sending of a SIP OPTIONS message, or equivalent message, from the calling terminal to the called terminal. This will typically include the capabilities of the calling terminal. In response, the called terminal returns a 200 OK message containing its capabilities. The calling terminal will then store the received capabilities in its cache, together with the calling party's telephone number. The called terminal acts in the same way. The previously cached data will be overwritten.

It is noted that the terminals will cache all capabilities received in the OPTIONS message or in the response, including unknown capabilities, i.e. those which a receiving terminal does not understand because it is not as advanced terminal as the remote terminal. It is also noted that the certain nodes within the IMS, such as the Serving Call State Control Function (S-CSCF) node or a SIP Application Server (AS), may be involved in the capability negotiation and, in some cases, may check and change SIP messages in transit to ensure that the exchanged capabilities correctly reflect the capabilities of the IMS (it is possible that an IMS may not support certain advanced features provided on a user terminal) and the services to which a subscriber has subscribed.

According to the approach described above, the capability exchange is conducted prior to any SIP connection initiation.

This approach facilitates the fast setup of connections once initiated. However, another approach would be to conduct the capability exchange at SIP connection initiation. Whilst the SIP OPTIONS message and response procedure may still be used, capability exchange may be carried out using the SIP INVITE message.

Capability negotiation may also be triggered by other events. For example, the default may be to conduct this negotiation only at SIP connection initiation, with this being overridden by an early negotiation in the event that a subscriber takes some action which is indicative that a connection is likely to be established, e.g. taking a photograph during a voice call. Capability negotiation may be carried out using SIP messages other than OPTIONS and INVITE.

Assume now that, following termination of the initial CS call, the subscriber makes a further call to the same peer subscriber. The capabilities of that peer subscriber's terminal will be stored in the cache, together with his or her telephone number. Following establishment of the CS call, the calling terminal determines that this is the case, and does not attempt a new capability negotiation unless one of the circumstances described below arises. Any attempt to establish a SIP connection during the voice call will make use of the cached capabilities (at both terminals). The likelihood is that the requested SIP connection will be established, with a significant saving in signalling resources.

The user terminals are however primed with a number of events which, when they occur and are detected, will trigger a further terminal capability negotiation and, if appropriate, a refresh of the capability cache. Examples of these events are:

1. Originating SIP Invitation failure

A sent SIP session invitation fails due to non-supported capability at the receiving terminal, signalled by the receipt of a SIP error message at the sending terminal. This could happen due to the remote end user temporarily or permanently changing his or her terminal for a less capability-rich terminal. The terminal which sent the invitation shall refresh its cache by sending a SIP OPTIONS message to the remote terminal, and update the cache according to the new capabilities returned in the 200 OK response. However, if a SIP error message is received instead of a 200 OK, the terminal shall refresh its cache in accordance with the error code, e.g. reset the cache completely if the error code indicates that this is a non-IMS terminal/end user.

2. Receiving a SIP Invitation with new capabilities

A received SIP session invitation request (SIP INVITE) includes capabilities that are not in the current cache of the called user terminal. This could happen due to the calling terminal having temporarily or permanently upgraded his or her terminal by, for example, downloading a more capability rich client. The calling terminal might first have checked the cached capability data for the called terminal and determined that that terminal supports the service which the called terminal wishes to initiate (prior to the upgrade, the calling terminal might not have understood the function of the relevant capabilities). This approach requires that the receiving terminal always compare received capabilities with cached capabilities.

The invited end user terminal updates its cache with the new capabilities found in the SIP INVITE message.

3. Refresh when receiving a capability query.

This could arise due to a remote end user having purchased a brand new terminal, with the need to construct a cache at that terminal, whilst a remote terminal currently holds in its cache capability information for the remote subscriber's old terminal. The receiving terminal caches the capabilities of the querying terminal if these are included in the SIP OPTIONS message or, if not, sends its own SIP OPTIONS message to the distant terminal and acts upon the response.

Figure 2:
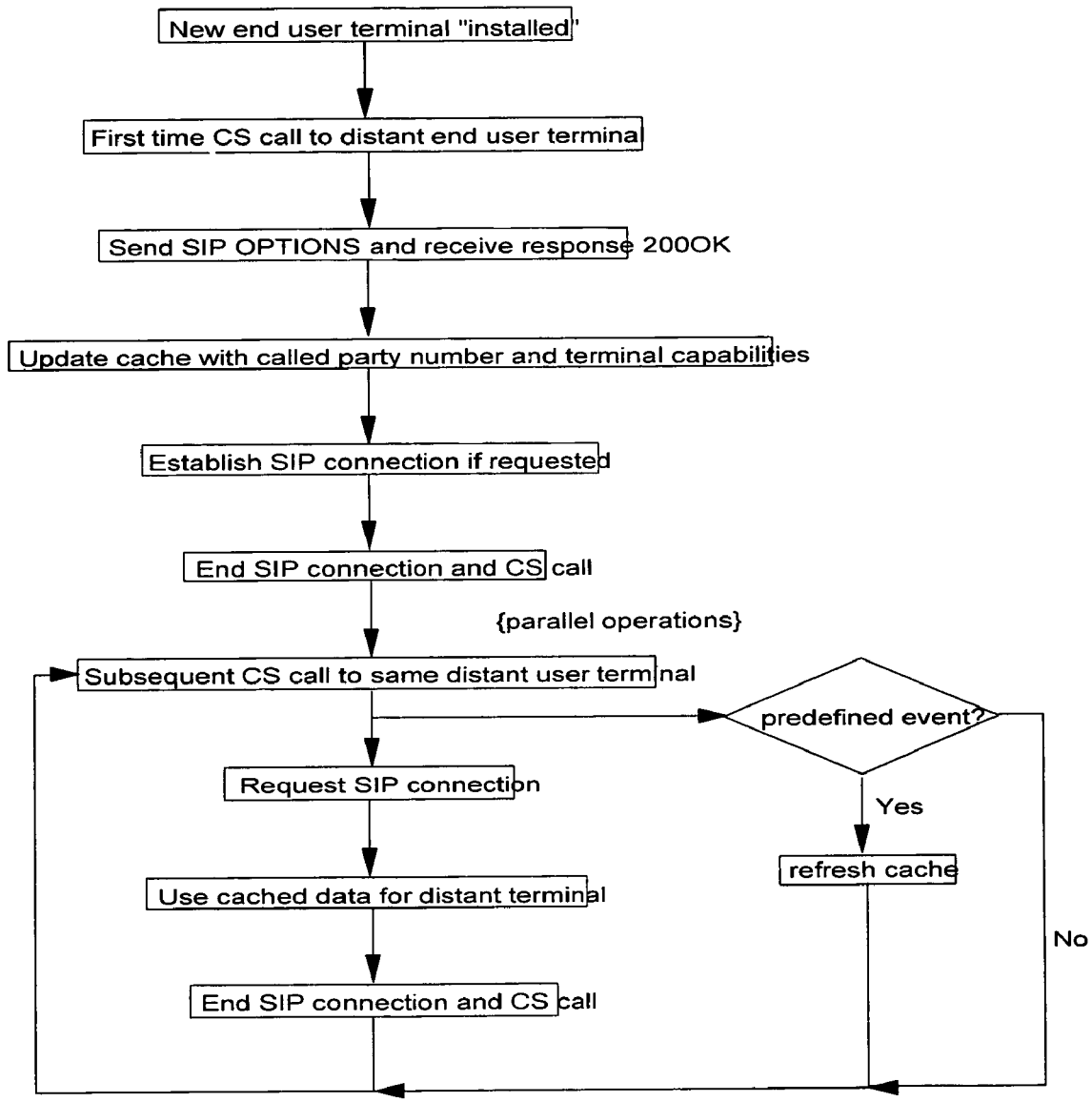
FIG. 2 is a flow diagram illustrating a method of refreshing cached terminal capabilities at a mobile terminal.
Figure 3:
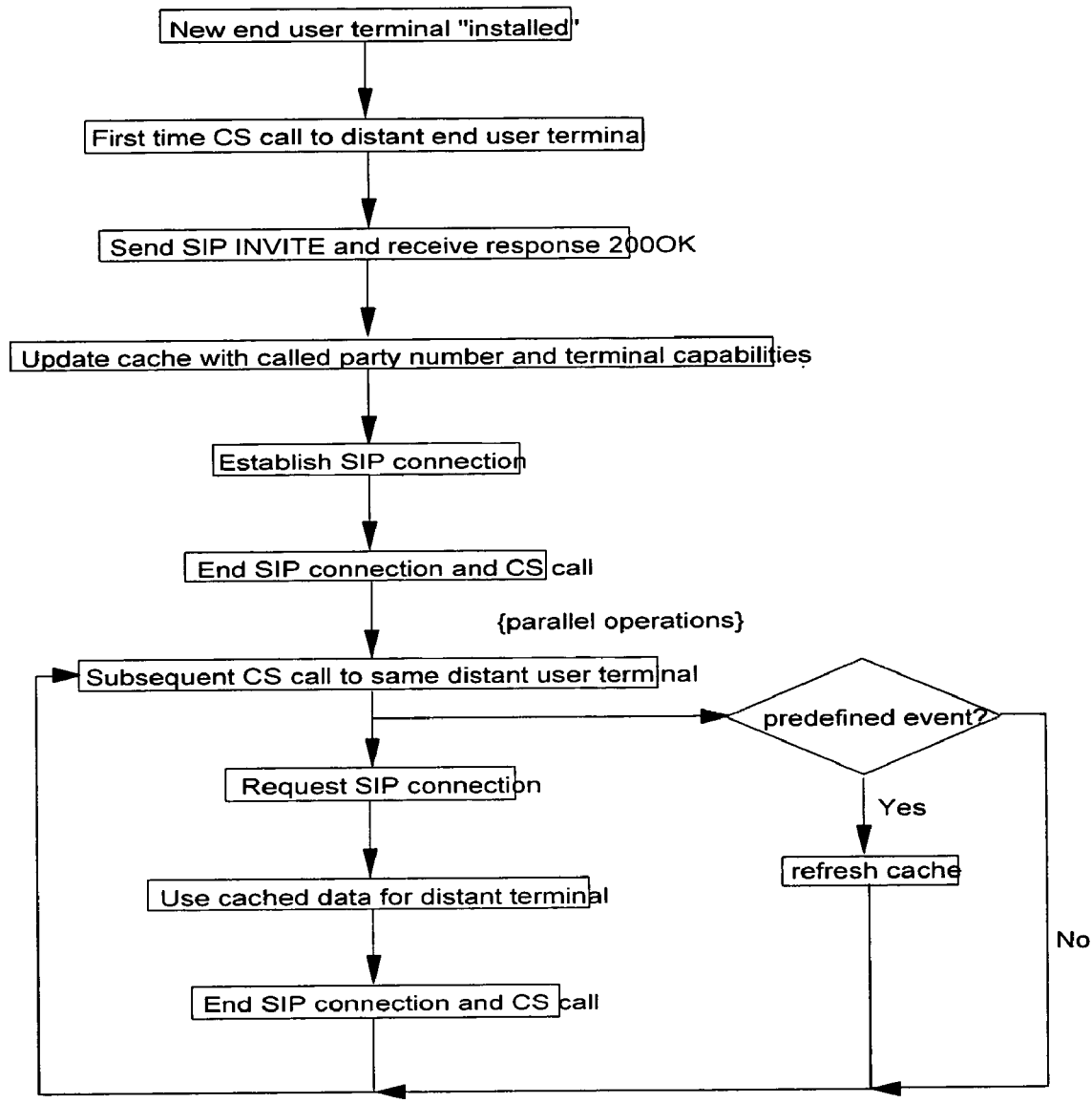
FIG. 3 is a flow diagram illustrating a modified method of refreshing cached terminal capabilities at a mobile terminal.

FIG. 2 is a flow diagram illustrating this method of maintaining the capability cache up to date, where capability exchange utilises the SIP OPTIONS method. FIG. 3 illustrates the alternative approach where capability exchange is performed using the SIP INVITE message.

The inventive principle outlined here can be applied to other protocols, for example the H.324 multimedia telephony standard defined by the ITU. In particular it can be applied to the 3G-324m standard which is based upon H.324 and which is designed to support the real-time communication of wireless multimedia services over existing circuit-switched wireless networks. 3G-324m includes a mechanism for identifying to the participating terminals the session parameters that the terminals are capable of using during the call session. These session parameters, which include terminal capabilities, can be cached following the first establishment of a connection between terminals. As described above in respect of SIP, a number of events can be defined which will trigger a cache refresh.

Whilst the above discussion has been concerned with the establishment of a SIP call following the establishment of a CS call, the technology disclosed herein provides a mechanism for reducing the signalling associated with all SIP calls, regardless of whether or not they are initiated after a CS call. It might thus be advantageous to store third party SIP addresses together, or instead of, telephone numbers in a terminal's cache. This would provide a means for obtaining peer capability data in the event that a SIP call is initiated using a SIP address (rather than a telephone number).

It will be appreciated by the person of skill in the art that various modifications may be made to the above described embodiments without departing from the scope of the present invention.

The invention claimed is:

1. A method of maintaining cached information at an end user terminal of a telecommunication system, the cached information comprising capability information for one or more other end user terminals and/or associated subscribers and the cached information being used to control the establishment of communication channels between terminals, the method comprising:
    predefining both of the following events, which are indicative of a change in a terminal's capabilities:
        the end user terminal receiving a connection initiation failure message from a peer terminal, returned in response to a connection initiation request;
        the end user terminal receiving a connection initiation request from a peer terminal and containing or pertaining to capabilities not currently identified in the cached information for that peer terminal;
    examining incoming signalling messages received from peer terminals to determine whether or not one of said events has occurred; and
    if one of said events has occurred, reacting by refreshing the cached information for the end user terminal.

2. A method according to claim 1, the method comprising initially populating the cache for each other end user terminal at the first communication with that other terminal.

3. A method according to claim 1, wherein said step of refreshing the cached capability information for the end user terminal comprises updating the cache entry for that terminal with information contained in a received message and/or sending a capability request to the peer terminal and refreshing the cache based upon the contents of the response.

4. A method according to claim 1, wherein said capability information comprises Session Initiation Protocol terminal capabilities.

5. A method according to claim 4, wherein Session Initiation Protocol capability information is exchanged between terminals using SIP OPTIONS or INVITE mechanisms.

6. A method according to claim 1, wherein said capability information comprises H.324 terminal capabilities.

7. A method according to claim 1, wherein said events are stored at the end user terminal or are implemented by way of executable software code.

8. An end user terminal for use with a telecommunications network, the terminal comprising:
- a first memory configured to store cached information comprising capability information for one or more other end user terminals and/or associated subscribers; and
- a second memory configured to store both of the following events, which are indicative of a change in a terminal's capabilities:
  - the end user terminal receiving a connection initiation failure message from a peer terminal, returned in response to a connection initiation request;
  - the end user terminal receiving a connection initiation request from a peer terminal and containing or pertaining to capabilities not currently identified in the cached information for that peer terminal; and
- a processor configured to examine incoming signalling messages received from peer terminals to determine if one of said events has occurred, and if so, to perform a refresh of the cached information for the end user terminal.

9. A terminal according to claim 8, the terminal being a Session Initiation Protocol enabled terminal.

10. A terminal according to claim 8, the terminal being an H.324 enabled terminal.

11. A method of maintaining cached information at an end user terminal of a telecommunication system, the cached information comprising capability information for one or more other end user terminals and/or associated subscribers and the cached information being used repeatedly to control the establishment of communication channels between terminals, the method comprising:
- predefining of of the following signalling message types, which are indicative of a change in a terminal's capabilities, for signalling messages to be received by the end user terminal from peer terminals;
  - a connection initiation failure message, returned in response to a connection initiation request;
  - a connection initiation request and containing or pertaining to capabilities not currently identified in the cached information for that peer terminal;
- examining incoming signalling messages received from peer terminals to determine whether or not they match one of said predefined types; and
- if an incoming signalling message does match one of said predefined types, reacting by refreshing the cached information for the end user terminal.

* * * * *